Jan. 10, 1961　　　J. MORKOSKI　　　2,967,574
CONTROL MEANS FOR DISK HARROW
Filed Jan. 12, 1959　　　　　　　　　　2 Sheets-Sheet 2

Inventor:
James Morkoski
Paul O. Pippel
Atty.

United States Patent Office 2,967,574
Patented Jan. 10, 1961

2,967,574

CONTROL MEANS FOR DISK HARROW

James Morkoski, Clarendon Hills, Ill., assignor to International Harvester Company, Chicago, Ill., a corporation of New Jersey Filed Jan. 12, 1959, Ser. No. 786,251

6 Claims. (Cl. 172—328)

This invention relates to agricultural implements and particularly to disk harrows. More specifically, the invention concerns wheel controlled disk harrows and stabilizing means therefor.

This invention is described in its relation to a tandem disk harrow of the offset type wherein front and rear laterally converging gangs are mounted in relatively fixed angular relation on a wheel supported frame. Such a machine should be allowed to float and follow the ground contour in operation but is unstable in transport and unless provision is made to stabilize the harrow it will tilt about the wheel supports, and an object of the invention is to provide improved stabilizing means for a tandem disk harrow.

Another object of the invention is the provision, in a tandem disk harrow, particularly of the wheel controlled type, of novel power means for lifting the harrow frame by vertically moving the wheels and for correlating this motion of the supporting wheels with pivoting of the hitch structure of the harrow to provide a stable machine in transport while accommodating floating of the harrow in operation.

Figure 1:
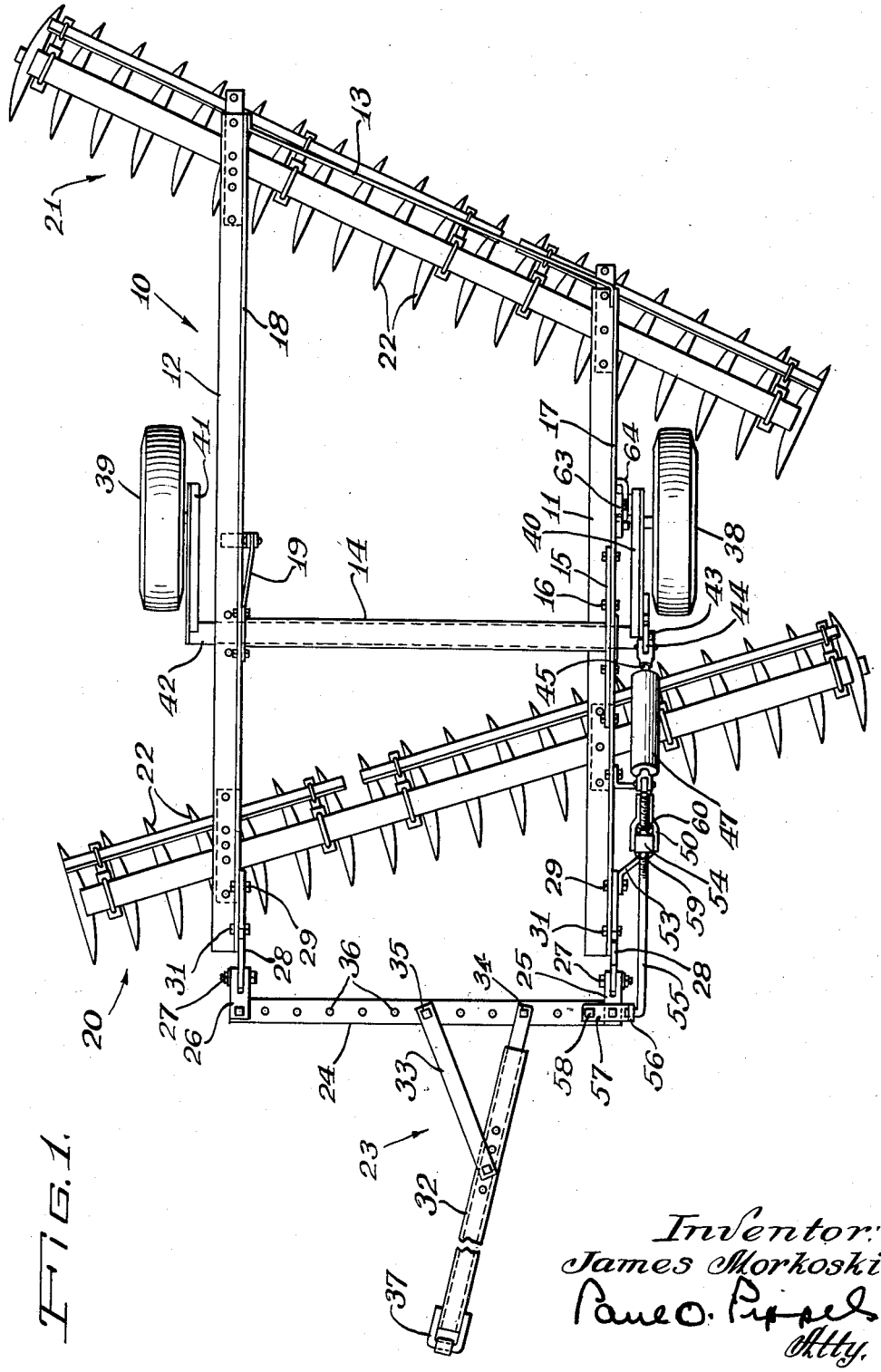
Figure 2:
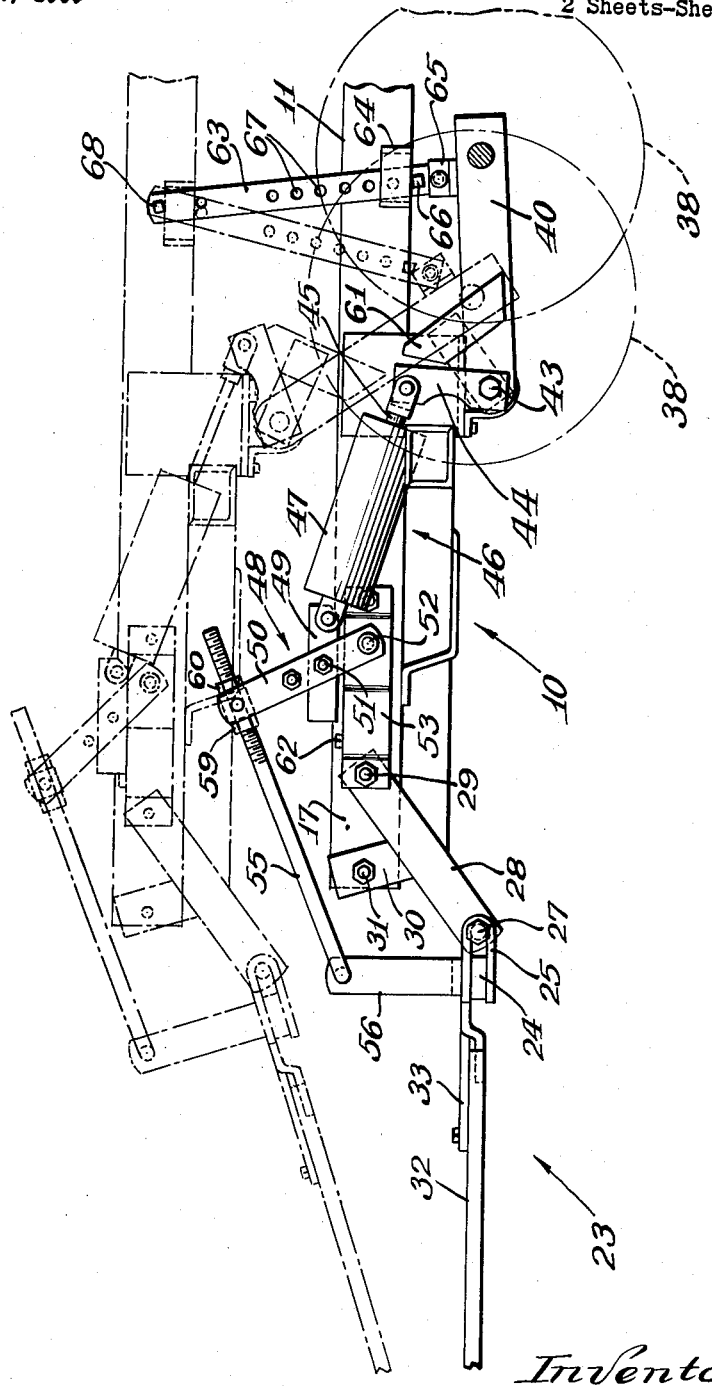

Other objects and advantages of the invention will become clear from the following detailed description when read in conjunction with the accompanying drawings wherein:

Fig. 1 is a plan view of a wheel controlled offset disk harrow embodying the features of this invention; and Fig. 2 is an enlarged detail in side elevation of a portion of the structure shown in Fig. 1.

In the drawings, the numeral 10 designates a generally rectangular frame including laterally spaced angle bars 11 and 12, the latter being somewhat longer than bar 11 and connected thereto by a cross brace 13. Another brace 14 extends between the bars 11 and 12 medially of the ends thereof and has affixed to one end thereof a plate 15 secured by bolts 16 to the upwardly extending flange 17 of bar 11. The other end of brace 14 is connected to the upwardly extending flange 18 of frame bar 12 by an adjustable plate 19 the function and purpose of which and brace 14 form no part of this invention. A further description thereof may be had by reference to copending U.S. application Serial No. 781,731, filed December 19, 1958.

Front and rear disk gangs 20 and 21, of conventional form, are adjustably mounted on the harrow frame 10 by any suitable means to accommodate varying the angle between the gangs, the harrow shown being a right-hand offset disk harrow with the concave faces of the disks 22 of the front gang facing diagonally to the right while the concave faces of the rear disks 22 are directed to the left.

The harrow of this invention is provided with a pivoted hitch frame 23 comprising a transverse pull bar 24 having rearwardly extending clevises 25 and 26 secured to its ends and carrying pivot pins 27 connected to the forward ends of forwardly and downwardly extending straps 28, the rear ends of which are secured ot the flanges 17 and 18 of the respective frame bars 11 and 12 by bolts 29. Lugs 30 on the straps 28 are also connected to the associated harrow frame bar 11 and 12 by bolts 31.

A draft bar 32 is connected to pull bar 24 by a bolt 34, and an additional strap 33 connects the draft bar 32 to pull bar 24 by a bolt 35 receivable in any of a plurality of openings 36 provided in the pull bar to vary the angle of the draft bar relative thereto. Draft bar 32 is provided at its front end with a clevis 37 for connection to the draw bar of a tractor, not shown, by which the implement is propelled over the ground. It should thus be clear that the draft structure 23 is capable of vertical swinging about the axes of pins 27 relative to the frame bars 11 and 12 and disk gangs 20 and 21 in operation to allow the harrow to follow the contour of the ground.

The harrow of this invention is raised and lowered and supported in transport position by a pair of laterally spaced ground-engaging wheels 38 and 39 mounted at the rear ends of crank arms 40 and 41, respectively, affixed to the ends of transversely extending rockshaft 42 rockably mounted in any suitable manner on the frame bars 11 and 12. It has already been pointed out that an offset disk harrow should be free to float in its operating position in order for it to follow the ground contour, and that in a wheel supported harrow the harrow frame should be held steady with respect to the ground and not be allowed to tilt about the wheels as an axis during transport. Applicant has therefore devised an economical and efficient means for achieving the desired results.

The left-hand end of wheel shaft 42, as viewed in Fig. 1, carries a pivot bolt 43 upon which is pivotally mounted a rock arm 44 closely adjacent wheel-carrying arm 40, and pivotally connected at its upper end to the piston rod 45 of a hydraulic ram 46, the cylinder 47 of which is pivotally connected to a movable member 48 including a horizontal block 49 and an arm 50 pivotally connected to said block at 51. Arm 50 is pivotally mounted at 52 on a bracket 53 secured to the frame bar 11 and is bifurcated at its upper end to pivotally support a swivel 54 adapted to slidably receive a rod 55.

The forward end of rod 55 is bent laterally for pivotal connection to the upper end of an arm 56 having a lower angle portion 57 secured to the left-hand end of pull bar 24 by bolts 58. Movement of member 48 is thus transmitted to hitch frame 23 through rod 55 and arm 56. Arm 55 is adjustable in its effective length, the rear end thereof being threaded to receive nuts 59 and 60 on opposite sides of swivel 54.

Since hitch frame 23, movable member 48 and rock arm 44 are free to move about their pivots, hydraulic ram 46 is free to move with them in the operating position of the implement as shown in solid lines in Fig. 2, so that the tool frame 10 is able to pivot relative to the hitch frame 23 as well as the tractor to allow the implement to follow the ground contour.

Upon operation of the hydraulic ram 46 to raise the implement to transport position, the piston rod 45 extends in cylinder 47 and lost motion is first taken up between rock arm 44 and a stop member 61 affixed to wheel arm 40. Upon engagement of arm 44 with stop 61, the other end of the ram begins to move member 48 to cause pivoting of hitch frame 23 relative to the tool frame. Movement of member 48 continues until lost motion is taken up between the forward end of block 49 and a stop 62 affixed to the upper edge of bracket 53, whereupon further extension of the ram 46 moves the tool frame relative to the supporting wheels to the dotted line position shown in Fig. 2. This is the transport position of the implement wherein the tool frame 10 and the hitch frame 23 are held against relative vertical swinging about the pivotal connection of the hitch frame to the tool frame. The implement is thus maintained in a stable transport position with the tool frame parallel to the ground, supported upon the wheels 38 and 39 disposed between gangs 20 and 21.

In the operating position of the implement as shown in solid lines in Fig. 2, the wheels 38 and 39 function as gage wheels and depth adjustment is made by means of a bar 63 slidable in a U-shaped bracket 64 affixed to flange 17 of frame bar 11 and pivotally connected at its lower end to a lug 65 secured to wheel arm 40. A stop bolt 66 is insertable in any one of a plurality of openings 67 provided in bar 63 for engagement with the underside of bracket 64 to limit the upward movement of the wheels 38 and 39 relative to the tool frame. Another stop bolt 68 is provided at the upper end of bar 63 for engagement with the upper edge of bracket 64 to limit swinging of wheel arms 40 in a clockwise direction as viewed in Fig. 2.

It is believed that the harrow stabilizing and lifting means of this invention will be clearly understood from the foregoing description. It should likewise be understood that the invention has been described in its preferred embodiment only, and that modifications may be made in the invention without departing from the spirit thereof or the scope of the appended claims.

What is claimed is:

1. In a disk harrow including a tool frame, a pair of tandem disk gangs secured to the frame in laterally converging relation, and a transverse rockshaft mounted on the frame and having wheel-carrying arms thereon for swinging in a vertical plane between operating and transport positions of the tool frame, the combination of a hitch frame pivotally connected to the forward end of said tool frame for vertical swinging, thrust means operatively connecting the rockshaft to said hitch frame to effect a controlled pivoting thereof in response to vertical swinging of said wheels, lost motion means in said thrust means accommodating free vertical swinging of the hitch frame relative to the tool frame in the operating position of said gangs, and means adjustable in length incorporated in said thrust means adapted to take up said lost motion upon extension thereof to transmit the vertical swinging of the wheels to the hitch frame.

2. The invention set forth in claim 1, wherein said means adjustable in length is a hydraulic ram having a lost motion connection at one end through said thrust means to the hitch frame and a lost motion connection at its other end to said wheels effective in the operating position of the disk gangs to accommodate floating thereof relative to the wheels and the hitch frame.

3. In a disk harrow including a tool frame, a pair of tandem disk gangs secured to the frame in laterally converging relation, and a transverse rockshaft mounted on the frame and having wheel-carrying arms thereon for swinging in a vertical plane between operating and transport positions of the tool frame, the combination of a hitch frame pivotally connected to the forward end of said tool frame for vertical swinging, thrust means operatively connecting the rockshaft to said hitch frame to effect a controlled pivoting thereof in response to vertical swinging of said wheels, said thrust means comprising a movable member mounted on the tool frame, means connecting said movable member to the hitch frame to transmit movement of the movable member thereto, an arm pivotally mounted on said rockshaft and operatively engageable after a predetermined movement thereof with one of said wheel arms to swing the latter, an extensible member connected between said arm and said movable member, and a stop on the tool frame engageable with the movable member to limit the swinging of the hitch frame.

4. In a disk harrow including a tool frame, a pair of tandem disk gangs secured to the frame in laterally converging relation, a transverse rockshaft mounted on the frame and having wheel-carrying arms thereon for swinging in a vertical plane between operating and transport positions of the tool frame, and a hitch frame connected to the tool frame for vertical swinging of the latter relative thereto in operation, the combination of a hydraulic ram extending between said rockshaft and the hitch frame, means forming a one-way connection between one end of the ram and said wheel arms for swinging the latter downwardly to raise the frame, said connection accommodating swinging of the wheel arms in the operating position of the harrow independent of the ram, means forming a connection between the other end of the ram and the hitch frame for swinging the latter relative to the tool frame upon extension of the ram, and stop means on the frame limiting the extension of the ram.

5. The invention set forth in claim 4, wherein the connection between the other end of the ram and the hitch frame includes a movable member anchoring one end of the ram, a connection between the movable member and the hitch frame, and a stop limiting the movement of the movable member.

6. In a disk harrow having a tool supporting frame including laterally spaced longitudinally extending frame bars, a pair of tandem disk gangs secured to said frame bars in laterally converging relation, and a wheel shaft having wheel-carrying arms thereon and rockably mounted on the tool supporting frame to raise and lower the latter, the combination of a hitch frame pivotally connected to the forward end of said tool supporting frame for vertical swinging relative thereto, thrust means connecting the wheel shaft to said hitch frame to transmit the motion of the wheel shaft thereto when the harrow is raised to transport position, said thrust means comprising a movable member mounted on the tool supporting frame, a thrust link connecting said movable member to the hitch frame, an arm pivoted on said wheel shaft, extensible means connecting said arm to said movable member, and stop means associated with said wheel shaft engageable with said arm to transmit rocking of said wheel shaft through said movable member to the hitch frame to pivot the latter relative to the tool supporting frame, and another stop on the harrow frame engageable with said movable member after a predetermined extension of the extensible member to limit the pivoting of the hitch frame.

References Cited in the file of this patent

UNITED STATES PATENTS

| 1,598,803 | Brown et al. | Sept. 7, 1926 |
| 1,947,640 | Brodersen | Feb. 20, 1934 |
| 2,729,157 | Webb | Jan. 3, 1956 |
| 2,767,538 | Scheidenhelm | Oct. 23, 1956 |
| 2,869,305 | Murray | Jan. 20, 1959 |